United States Patent
Sutter et al.

(10) Patent No.: US 6,696,804 B1
(45) Date of Patent: Feb. 24, 2004

(54) ELECTRONICALLY COMMUTATABLE MOTOR COMPRISING AN ELECTRONIC CONTROL UNIT

(75) Inventors: Joerg Sutter, Gaggenau (DE); Wolfgang Schwenk, Oberkirch-Tiergarten (DE); Claude Berling, Drusenheim (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,462

(22) PCT Filed: Sep. 6, 2000

(86) PCT No.: PCT/DE00/03058

§ 371 (c)(1),
(2), (4) Date: Jul. 29, 2002

(87) PCT Pub. No.: WO00/20765

PCT Pub. Date: Mar. 22, 2001

(30) Foreign Application Priority Data

Sep. 15, 1999 (DE) .......................................... 199 44 197

(51) Int. Cl.⁷ .............................................. H02P 6/20
(52) U.S. Cl. ...................... 318/254; 318/271; 318/279; 318/434; 318/431
(58) Field of Search ................................ 318/138, 254, 318/268, 271, 276, 277, 278, 279, 430, 431, 434, 439

(56) References Cited

U.S. PATENT DOCUMENTS

| | | | | |
|---|---|---|---|---|
| 4,602,701 A | * | 7/1986 | Tanahashi | ................... 187/296 |
| 4,748,386 A | | 5/1988 | Nakanishi et al. | |
| 4,914,361 A | * | 4/1990 | Tajima et al. | ................ 318/254 |
| 5,097,193 A | * | 3/1992 | Neis et al. | .................. 318/800 |
| 5,276,392 A | * | 1/1994 | Beckerman | ................. 318/751 |
| 5,349,276 A | | 9/1994 | Mezzatesta, Jr. et al. | |
| 5,576,606 A | * | 11/1996 | Nguyen Phuoc et al. | ... 318/801 |
| 5,602,708 A | | 2/1997 | Felgenhauer | |
| 5,744,921 A | | 4/1998 | Makaran | |

FOREIGN PATENT DOCUMENTS

| | | |
|---|---|---|
| DE | 43 30 823 | 3/1995 |
| JP | 60 005 797 | 1/1985 |
| JP | 60 176 475 | 9/1985 |
| JP | 10 322 894 | 12/1998 |

* cited by examiner

*Primary Examiner*—Bentsu Ro
(74) *Attorney, Agent, or Firm*—Kenyon & Kenyon

(57) ABSTRACT

An electronically commutatable motor is disclosed, whose field windings are controllable via electronic control unit using PWM control signals via semiconductor output stages, a setpoint being selectable for the control unit and the control unit outputting corresponding PWM control signals to the semiconductor output stages. In order to recognize malfunctions which could result in overload of the motor and the electronic components thereof even in the acceleration phase and to be capable of using this to protect against overload, after selection of the setpoint and/or switching on of the control unit and/or the semiconductor output stages, the control unit outputs ramp-type speed-increasing PWM control signals to the semiconductor output stages during a selected or selectable acceleration time until the final control of the semiconductor output stages corresponding to the setpoint is reached, during the acceleration time a setpoint speed corresponding to the PWM control signals may be compared with the detected actual speed of the motor, and, in the event of deviations of the actual speed from the setpoint speed by a selected or selectable speed deviation, the control unit and/or the semiconductor output stages may be switched off.

9 Claims, 1 Drawing Sheet

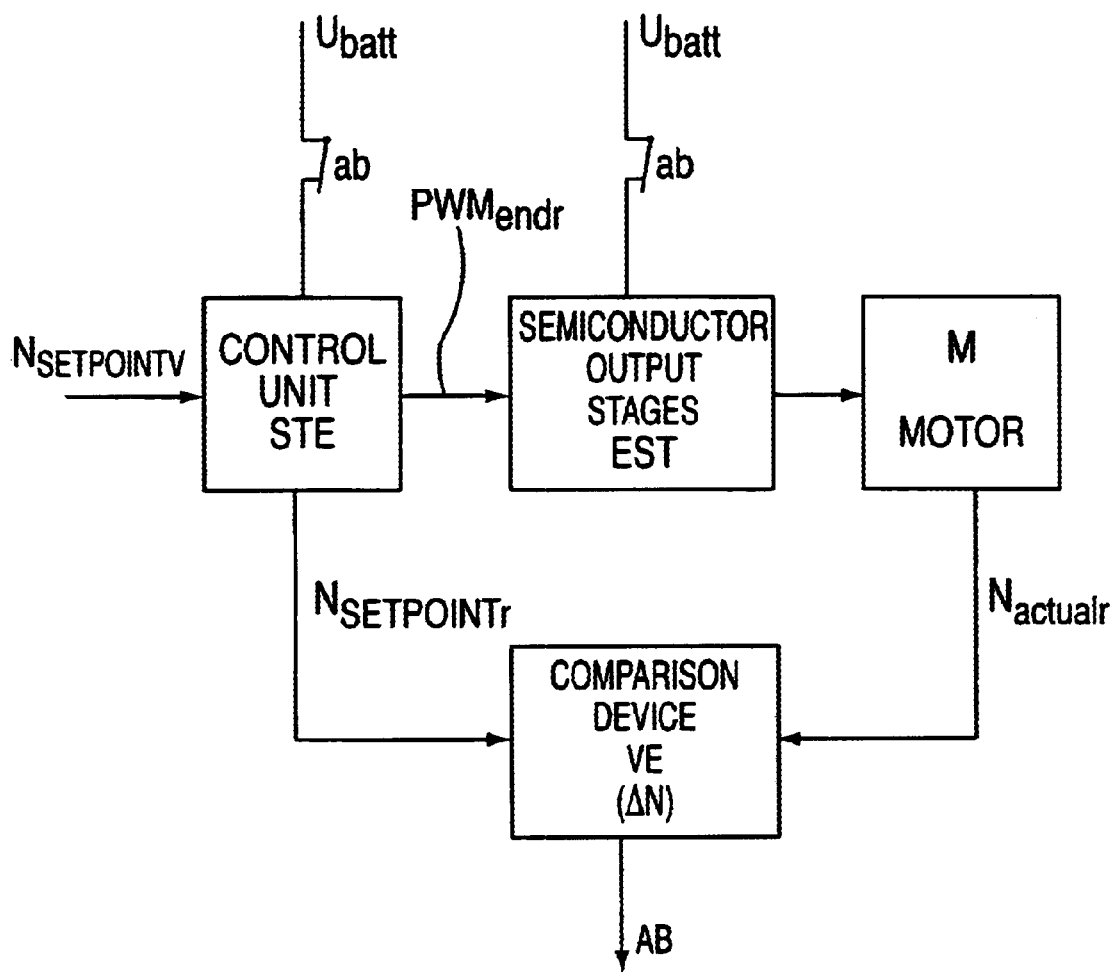

ELECTRONICALLY COMMUTATABLE MOTOR COMPRISING AN ELECTRONIC CONTROL UNIT

FIELD OF THE INVENTION

The present invention relates to an electronically commutatable motor, whose field windings are controllable by an electronic control unit via semiconductor output stages using PWM control signals, a nominal setpoint speed being selectable for the control unit and the actual speed being comparable with the setpoint, and when the actual speed deviates from the setpoint by a selected or selectable speed difference, the control unit and/or the semiconductor output stages are capable of being switched off.

BACKGROUND INFORMATION

An electronically commutatable motor is discussed in U.S. Pat. No. 5,744,921. This motor is operable at different nominal operating speeds, the setpoint applied determining the PWM control signals and the associated nominal operating speed. Each operating state may be monitored by comparison and deviation between the actual speed and an associated setpoint speed. The motor may be switched off when the speeds differ by a selected speed deviation. In this motor, the control unit may be capable of modifying the PWM control signals so that the motor runs in the correct direction of rotation for the operating state as a function of the rest position of the rotor.

The motor may be switched off in the event of a speed deviation from the setpoint by a selected value, as discussed in Japanese Patent No. 10 322 894, where the motor may be switched off by switching off the supply voltage, as discussed in German Published Patent Application No. 43 30 823.

These types of electronically commutatable motors may be used for various applications. In this regard, it may happen that even the acceleration of the motor to a desired nominal operating speed, which is selectable or selected via a setpoint, does not occur in the correct way. The motor may be capable of stalling in the rest position or prevented from accelerating correctly by an excessive load or other impediments. Mechanical defects may also cause such a phenomenon. The motor may also block in any phase of the acceleration. The motor and/or its electronic components may be overloaded and even damaged.

It is the object of the present invention to monitor and switch off an electronically commutatable motor of the type initially described, during each phase of the acceleration in such a way that an overload or damage to the motor is prevented as early as in this acceleration phase, rather than in the desired operating state.

SUMMARY OF THE INVENTION

In an exemplary embodiment of the present invention, with the selection of the setpoint and/or switching on the control unit and/or the semiconductor output stages as a function of the selected setpoint, the control unit determines a corresponding acceleration time in which the PWM control signals, which gradually increase the speed, increase to a final value associated with the selected setpoint. In the control unit a setpoint speed is associated with each control value of the PWM control signals. In each control phase of the acceleration time, the actual speed is measured and compared with the setpoint speed associated with the corresponding PWM control signal. Switch-off occurs as early as during acceleration if in a control phase the measured actual speed deviates by the selected speed difference from the setpoint speed associated with the corresponding PWM control signal.

The acceleration phase is divided into time segments by the gradually increasing PWM control signals; in each case the coincidence of the actual speed with the setpoint (i.e., the PWM control signal being applied) also corresponds to the motor characteristic and indicates undistrubed acceleration of the motor. If a deviation from a permissible speed deviation occurs in a time segment of the acceleration phase, a mechanical or electric malfunction may be present, which may justify the motor being switched off in order to protect the motor or its components from overload and damage.

In this manner, the entire acceleration phase may be monitored for correct start and acceleration from the time the motor is switched on.

The PWM control signals which gradually increase the speed may continuously increase in pulse amplitude, pulse width, and/or commutating frequency.

The actual speed may be compared to the setpoint speed continuously or repeatedly at time intervals during the acceleration.

The simple protective circuit may be obtained by switching the control unit and/or the semiconductor output stages on and off by switching the supply voltage on and off.

For different operating modes, the design may advantageously be such that the acceleration time depends on the magnitude of the selectable setpoint and/or on the magnitude of the supply voltage.

The variation of the permissible speed deviation may be designed so that the selected speed deviation depends on the selected setpoint and/or on the magnitude of the supply voltage.

If necessary, the deviation from the selected speed deviation may be visually displayed and/or acoustically indicated.

The comparison device required to compare actual speed and setpoint speed may be integrated into the control unit.

For the duration of the operation of the motor with the operating speed defined by the selected setpoint, the comparison between actual and setpoint speed may be continued to obtain overload protection also in this phase of the steady-state operation and be capable of switching off if necessary.

BRIEF DESCRIPTION OF THE DRAWING

The FIGURE illustrates schematically an exemplary embodiment of the present invention.

DETAILED DESCRIPTION

The motor unit may include the following functional units: control unit STE, semiconductor output stages EST, and actual motor M having the field windings of the stator and the permanent magnet rotor, which may be designed as an external or internal rotor.

If motor M is to be put into operation, a setpoint $N_{setpointv}$ which characterizes a desired motor speed N is selected for control unit STE. The selection may, for example, be performed manually via a potentiometer. In this control unit STE, a function is stored which reflects the dependence of PWM control signals $PWM_{actual}$ for semiconductor output stages EST on the associated setpoint speed $N_{setpoint}$.

If a setpoint $N_{setpointv}$ is selected and control unit STE and semiconductor output stages EST are connected to supply voltage $U_{batt}$ (i.e., switched on), then a selected acceleration of motor M to the intended setpoint speed $N_{setpointr}$ is forced. For this purpose, a ramp-type PWM control which effects an increase in speed using PWM control signals $PWM_{endr}$ is performed and this is done in a selected or selectable acceleration time. In each phase of the acceleration, the setpoint speed $N_{setpointr}$ associated with the corresponding PWM control signal is compared with a detected actual speed $N_{actualr}$ by a comparison device VE in the control unit. Comparison device VE, which may be integrated into control unit STE, outputs a switch-off signal AB in the event a selected or selectable speed deviation $\Delta N$ is exceeded, in order to switch off control unit STE and/or semiconductor output stages EST, as contacts ab show, and to protect motor M and the electronic components from overload. The comparison between the two values—setpoint speed $N_{setpointr}$ and actual speed $N_{actualr}$—may be performed continuously or at intervals during the acceleration phase, with the possibility always existing of switching off if permissible speed deviation $\Delta N$ is exceeded.

The acceleration time may additionally be tailored to the magnitude of selected setpoint $N_{setpointv}$ and to the magnitude of supply voltage $U_{batt}$, with, for example, the acceleration time of the ramp also increasing with increasing setpoint $N_{setpointv}$. Permissible speed deviation $\Delta N$ may also be varied. Thus, permissible speed deviation $\Delta N$ may also increase and be selected larger with increasing magnitude of setpoint $N_{setpointv}$. The same also applies for supply voltage $U_{batt}$.

For specific applications it may be advisable to evaluate the exceeding of permissible speed deviation $\Delta N$ in control unit STE, display it optically and/or acoustically, and switch off control unit STE and/or semiconductor output stages EST with a delay, which may still avoid an overload of motor M and the electronic components.

The comparison between setpoint speed $N_{setpointr}$ and actual speed $N_{actualr}$ performed in the acceleration phase may also be performed in the subsequent steady-state operation of motor M using the setpoint speed determined by selected setpoint $N_{setpointv}$ and used for overload protection.

What is claimed is:

1. An electronically commutated motor comprising:

a control unit;

a plurality of semiconductor output stages;

field windings controllable by the control unit via the plurality of semiconductor output stages using a plurality of PWM control signals, a nominal setpoint speed being selectable for the control unit, an actual speed being comparable with the nominal setpoint speed, wherein in an event of a deviation of the actual speed from the nominal setpoint speed by a selectable speed difference, at least one of the control unit and the plurality of semiconductor output stages is capable of being switched off;

wherein with at least one of a selection of the nominal setpoint speed and a switching on of at least one of the control unit and the plurality of semiconductor output stages as a function of the nominal setpoint speed, the control unit determines an acceleration time in which the plurality of PWM control signals increase the actual speed gradually to a final value associated with the nominal setpoint speed;

wherein in the control unit, another setpoint speed is associated with each control value of the plurality of PWM control signals;

wherein in each control phase of acceleration time, the actual speed is measured and compared with the other setpoint speed associated with the corresponding PWM control signal; and wherein a switching-off occurs during the acceleration time if in the control phase the actual speed deviates from the other setpoint speed associated with the corresponding PWM control signal by the selectable speed difference.

2. The electronically commutatable motor according to claim 1, wherein at least one of an amplitude of a pulse, a pulse width, and a commutation frequency of the plurality of PWM control signals continuously increases during the acceleration time.

3. The electronically commutatable motor according to claim 1, wherein the actual speed and the other setpoint speed are compared during the acceleration time at least one of continuously and repeatedly at a plurality of time intervals.

4. The electronically commutatable motor according to claim 1, wherein at least one of the control unit and the plurality of semiconductor output stages is switched on and off by switching a voltage supply on and off.

5. The electronically commutatable motor according to claim 1, wherein the acceleration time is dependent on a magnitude of a supply voltage.

6. The electronically commutatable motor according to claim 1, wherein the selectable speed difference is dependent on at least one of the nominal setpoint speed and a magnitude of a supply voltage.

7. The electronically commutatable motor according to claim 1, wherein the switching off of at least one of the control unit and the plurality of semiconductor output stages is at least one of optically displayable and acoustically indicated.

8. The electronically commutatable motor according to claim 1, wherein the comparison of the other setpoint speed and the actual speed is performed by a comparison device integrated in the control unit.

9. The electronically commutatable motor according to claim 1, wherein the comparison between the other setpoint speed and the actual speed is continued with the nominal setpoint speed after the acceleration time for a duration of an operation of the electronically commutatable motor.

* * * * *